(12) United States Patent
Blackmore

(10) Patent No.: US 8,475,544 B2
(45) Date of Patent: Jul. 2, 2013

(54) COMBUSTIBLE ARTICLE

(76) Inventor: Richard Guy Blackmore, Canyon (CA)

(*) Notice: Subject to any disclaimer, the term of this patent is extended or adjusted under 35 U.S.C. 154(b) by 343 days.

(21) Appl. No.: 12/591,708

(22) Filed: Nov. 30, 2009

(65) Prior Publication Data

US 2011/0126452 A1     Jun. 2, 2011

(51) Int. Cl.
*C10L 5/44*     (2006.01)

(52) U.S. Cl.
USPC .................................. 44/532; 44/530; 44/605

(58) Field of Classification Search
USPC ................... 44/520–522, 530, 533, 535, 542, 44/544, 550, 595, 605, 606, 532; 131/216
See application file for complete search history.

(56) References Cited

U.S. PATENT DOCUMENTS

| | | | |
|---|---|---|---|
| 198,562 A | 12/1877 | Boda | |
| 201,045 A | 3/1878 | Prentice | |
| 201,184 A | 3/1878 | Lewis | |
| 213,768 A | 4/1879 | McShane | |
| 214,467 A | 4/1879 | Stoker | |
| 248,849 A | 11/1881 | Eddy | |
| 585,001 A | 6/1897 | MacDonald | |
| 694,027 A | 2/1902 | Pollard | |
| 3,883,317 A | 5/1975 | Neme | |
| 4,952,217 A | 8/1990 | Porter | |
| 5,766,275 A | 6/1998 | Chandaria | |
| 5,833,353 A * | 11/1998 | Smith | 362/180 |
| 5,858,032 A | 1/1999 | Hardy et al. | |
| 6,086,646 A | 7/2000 | Meske | |
| 6,855,181 B2 | 2/2005 | Kunnunen | |
| 2006/0156621 A1* | 7/2006 | Kraus et al. | 44/530 |
| 2006/0230673 A1 | 10/2006 | Barford et al. | |

FOREIGN PATENT DOCUMENTS

| | | |
|---|---|---|
| FR | 2808665 | 11/2001 |
| FR | 2808665 A1 * | 11/2001 |

* cited by examiner

*Primary Examiner* — Pamela H Weiss
(74) *Attorney, Agent, or Firm* — Richard D. Okimaw

(57) ABSTRACT

Disclosed is an apparatus for burning comprising a combustible body having an exterior surface and an axis extending between opposed top and bottom surfaces. The body has an interior surface defining a cavity extending from the top surface and a first blind bore extending radially from the cavity to the exterior surface wherein the interior surface includes a plurality of slots extending longitudinally therein.

17 Claims, 6 Drawing Sheets

COMBUSTIBLE ARTICLE

BACKGROUND OF THE INVENTION

1. Field of Invention

The present invention relates to combustible articles in general and in particular to rapidly lightable and long burning fire log.

2. Description of Related Art

Wood is a common fuel source for camp fires and the like. In such a capacity, there is need for the wood to be easy to light and have the ability to reliably burn for a long time. These two goals are often at odds with each other as, large pieces of wood are typically difficult to light but burn for a long time. Similarly, small pieces of wood are typically easier to light but burn for a relatively short period of time.

Additionally, in order to utilize a conventional camp fire or the like to cook, it is necessary to locate a pot or other cooking apparatus above or proximate to the fire. In doing so, it is also necessary to carefully control the size and heat output of the fire. Maintaining a camp fire at a consistent heat output is difficult as the fire will tend to burn hotly when a new piece of wood is added and cool over time.

Previous attempts have been made to permit a relatively large piece of wood to be readily lit with a fire starting location. Such devices have attempted to provide one or more slots or grooves however, providing such slots or grooves, while enhancing the ability to light the wood, will exasperate the above difficulty of having the fire burn hot at first and thereafter rapidly cool.

Previous attempts to solve the above difficulties have also attempted to provide narrow vertical slots or holes within a block of wood intersecting a horizontal passage. Such vertical slots or holes, once lit may be supplied with oxygen by the horizontal passage. However, the difficulty with such attempts is that in order to enhance the ability of the wood to be lit, the slots or holes should be relatively small or narrow so as to maintain edges thereof in close proximity to each other. However, in such an arrangement, a fire within these small slots or holes will burn at an unsatisfactorily slow rate and is often prone to produce a large amount of smoke. Conversely, if the slots or holes are make to large, such structures will not greatly enhance the ability of the wood to be lit.

SUMMARY OF THE INVENTION

According to a first embodiment of the present invention there is disclosed an apparatus for burning comprising a combustible body having an exterior surface and an axis extending between opposed top and bottom surfaces. The body has an interior surface defining a cavity extending from the top surface and a first blind bore extending radially from the cavity to the exterior surface wherein the interior surface includes a plurality of slots extending longitudinally therein.

The cavity may be tapered from the top surface to a bottom end thereof. The interior surface may comprise plurality of substantially planar walls. The cavity may be defined by four substantially planar walls. The adjacent planar walls may be perpendicular to each other. The cavity may comprise a second blind bore extending longitudinally within the combustible body.

The slots may be grouped in pairs around the cavity. The grouped pairs of slots may be perpendicular to each other. The slots may extend parallel to adjacent planar walls.

The combustible body may be substantially cylindrical about the axis. The combustible body may be formed of organic material. The organic material may comprise wood. The wood may comprise a section of a tree. The wood may comprise compressed wood particles.

The top surface may include a plurality of grooves extending from the cavity to the exterior surface. The apparatus may further comprise a film of wax applied to the cavity.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
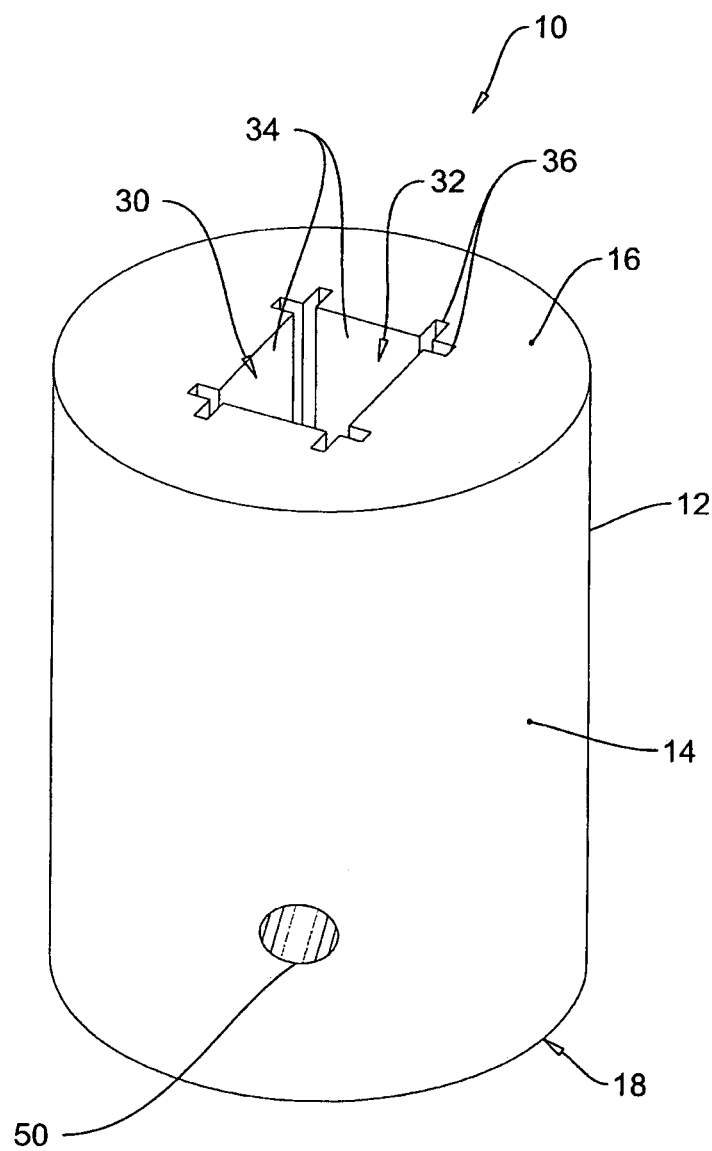
FIG. 1 is a perspective view of a combustible article according to a first embodiment of the present invention.

Referring to FIG. 1, an apparatus according to a first embodiment of the invention is shown generally at 10. The apparatus 10 comprises a body 12 formed of a combustible material. The body 12 includes a vertical cavity 30 and a horizontal bore 50 formed therein as will be further described below.

As illustrated, the body 12 comprises a substantially cylindrical body having an exterior surface 14 extending between top and bottom surfaces, 16 and 18, respectively. The body 12 may be formed of wood such as a section of a log or the like. It will also be appreciated as described below such a log may be cut or otherwise machined into the described shape by any known machining process such as, by way of non-limiting example, through the use of a drill or chain or other saw type. The body may also be formed of any other combustible material as may be available and desired by a user. By way of non-limiting example, the body 12 may be formed of compressed wood or other cellular fibres, compressed wood chips or sawdust or any other natural or synthetic combustible material. If the body 12 is formed of a compressed or otherwise aggregated material, it will be appreciated that the body may be formed by moulding or other conventional processes.

Figure 3:
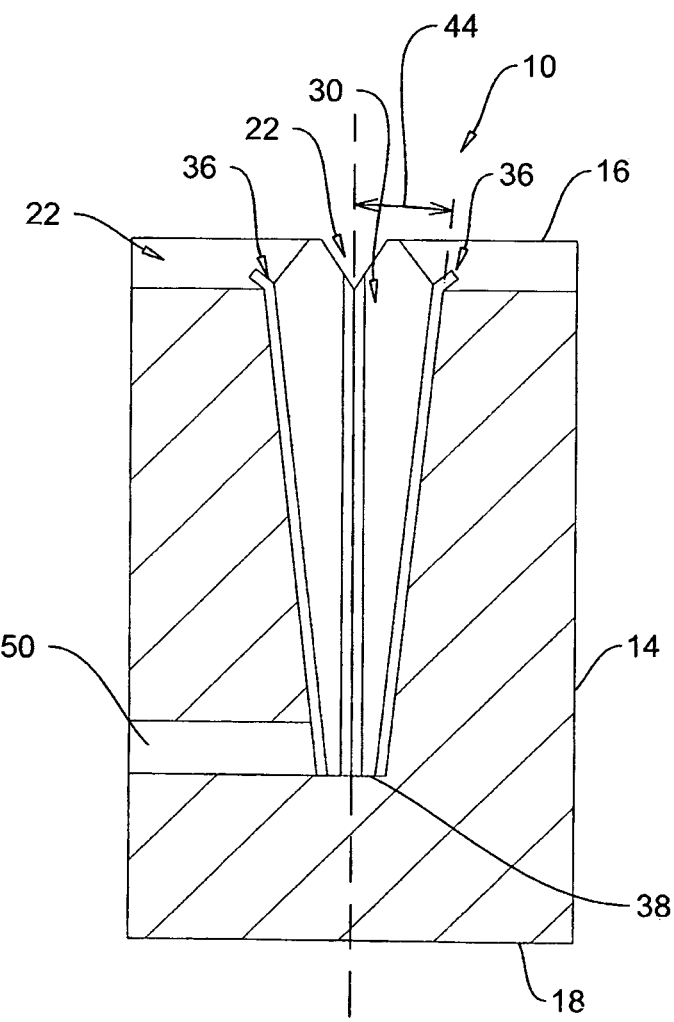
FIG. 3 is a cross-sectional view of the combustible article of FIG. 2 taken along the line 3-3.
Figure 6:
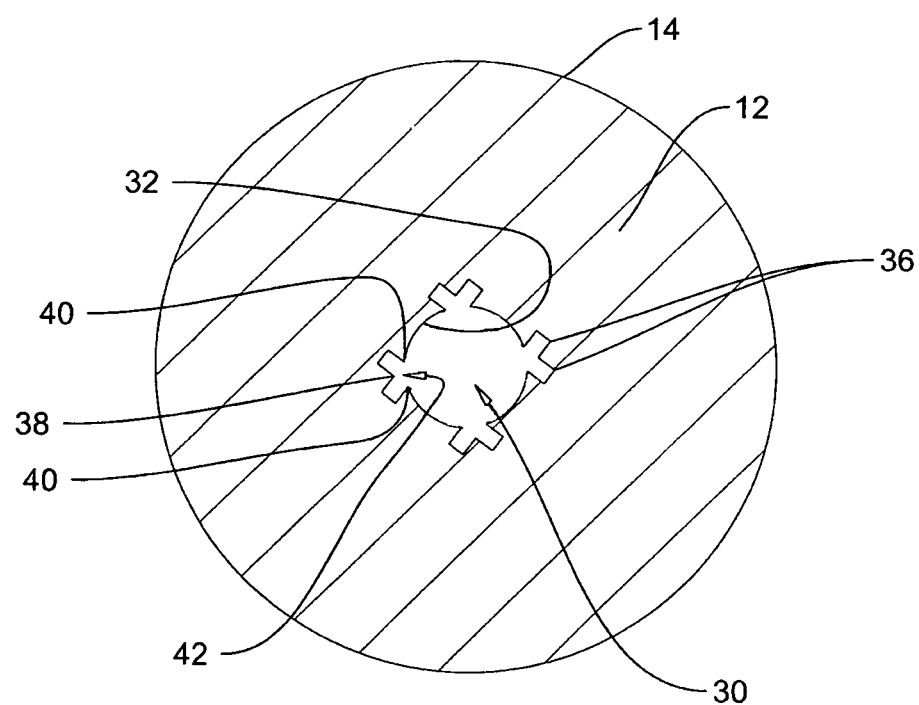
FIG. 6 is a cross-sectional view of the combustible article of FIG. 2 taken along the line 4-4 having a circular cavity according to a further embodiment of the present invention.

The cavity 30 is defined by an interior surface 32 which, as illustrated may be formed of a plurality of walls 34. As illustrated, the cavity 30 may be defined by four perpendicular walls 34 forming a square or rectangular cavity as illustrated in FIG. 3. It will also be appreciated that a different number of walls 34 may be utilized to form the cavity 30, such as a triangular or polygonal cavity. A single wall 34 may also be utilized to form the cavity 30 as illustrated in FIG. 6.

Figure 4:
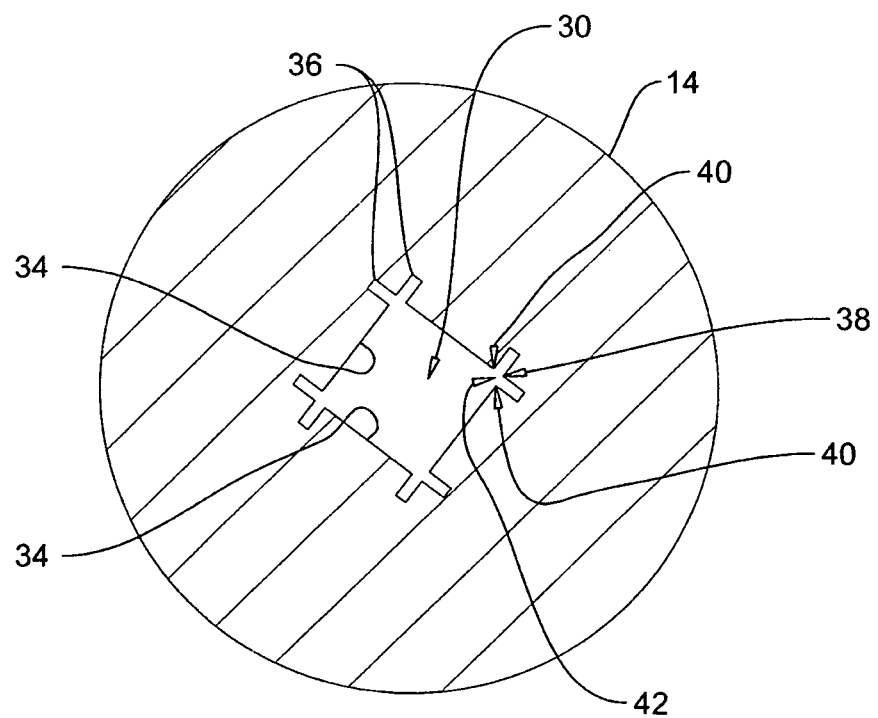
FIG. 4 is a cross-sectional view of the combustible article of FIG. 2 taken along the line 4-4.
Figure 5:
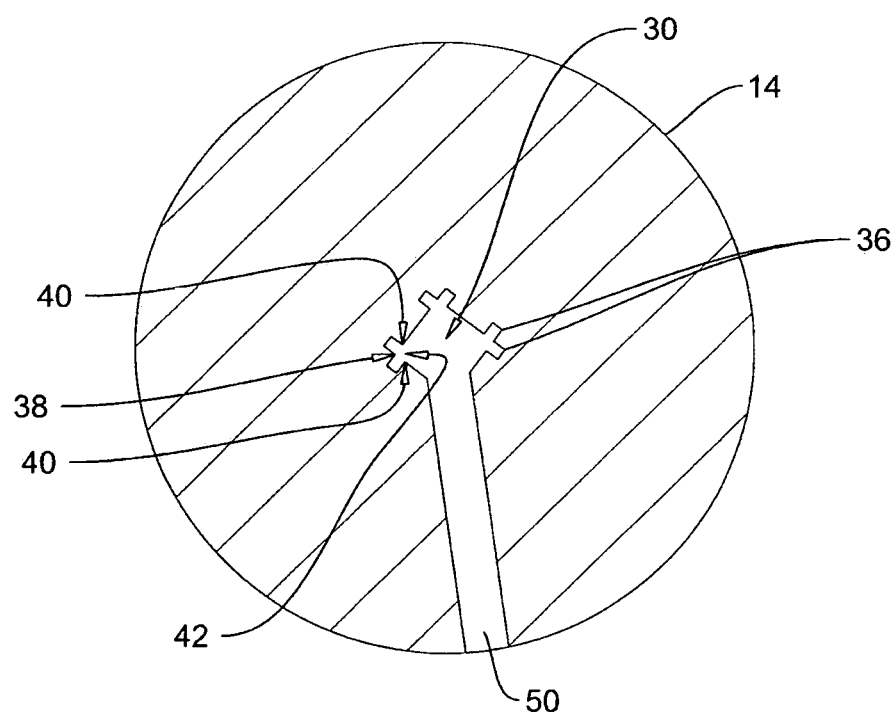
FIG. 5 is a cross-sectional view of the combustible article of FIG. 2 taken along the line 5-5.

The cavity 30 includes a plurality of slots 36 formed longitudinally therein extending from the top surface 16 to a bottom end 28 of the cavity 30. The slots 36 may be radially arranged around the interior surface 32. Optionally, the slots 36 may be arranged in pairs wherein the pairs of slots 36 are parallel or angularly oriented relative to each other. As illustrated the FIGS. 1 through 5, each slot 36 may extend into a wall 34 parallel to an adjacent wall 34. As illustrated, each slot 36 may form an extension of the adjacent wall 34 and may be formed at the same time by a saw or the like. As illustrated in FIGS. 4 and 5, locating each slot as an extension of an adjacent wall 34 forms an interior point 38 between the two slots and an exterior point 40 to either side of an opening 42 to the slots. The proximity of the interior point 38 to the exterior points 40 provides a plurality of relatively narrow edges which will be readily lit by an igniter or the like to as to assist in lighting the body 12.

Figure 2:
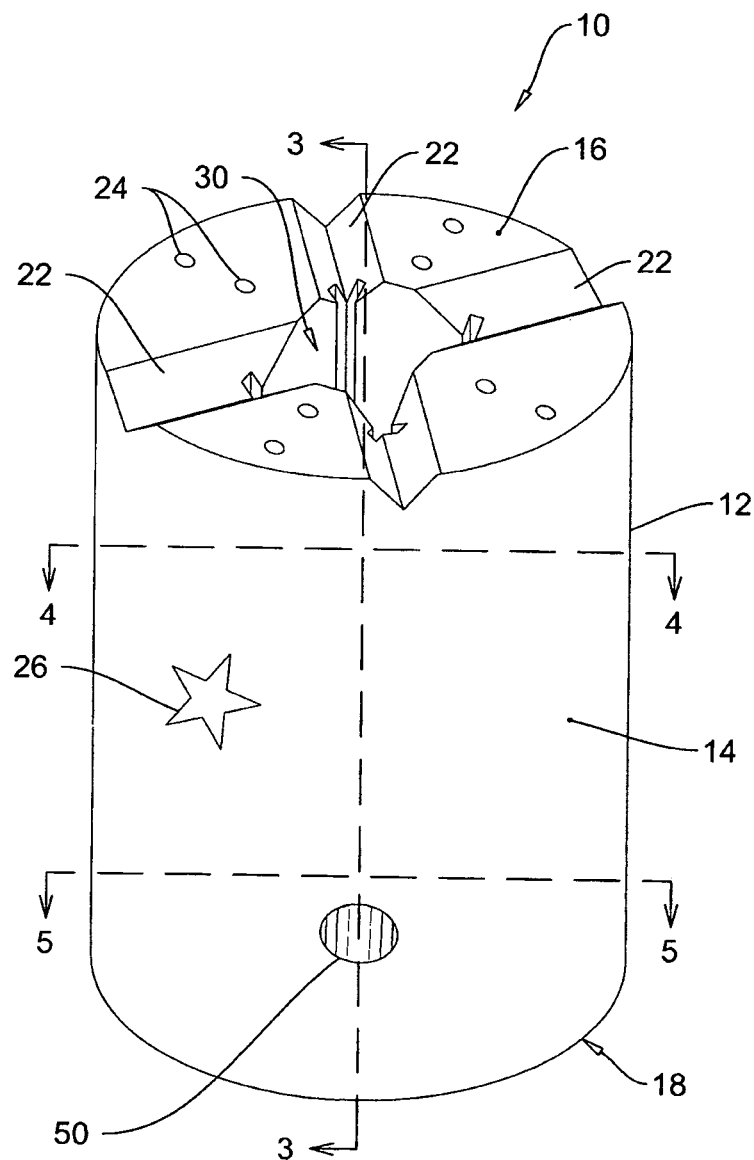
FIG. 2 is a perspective view of a combustible article according to a further embodiment of the present invention.

Turning to FIG. 2, the top surface 16 may include a plurality of grooves 22 extending from the exterior surface 14 to the vertical cavity 30. The grooves 22 may comprise a notched v-groove or any other suitable groove type, such as u-shaped, square by way of non-limiting example. The grooves 22 may be utilized to support a rotisserie or other cooking device so as to suspend a pot or the like over a fire within the cavity 30. The body 12 may also include one or more fastener bores 24 on the top surface 16. The fastener bores 24 may be sized to receive a fastener therein for securing a grill (not shown) thereto. The exterior surface 14 may also include a logo 26 or embossed or otherwise formed therein such that light from a fire burning within the body 12 will shine through the logo 26.

Turning now to FIG. 3, a vertical cross section of the apparatus 10 is illustrated with the bore 50 extending from the exterior surface 14 of the body 12 to the cavity 30. The bore 50 may be of any shape desired by the user such as by way of non-limiting example circular, rectangular, triangular, square or any other suitable shape. The bore 50 provides ventilation for a flame burning within the cavity and will be sized to permit a sufficient volume of air to be supplied to such flame. The height of the cavity 30 will be selected to have a ratio to the diameter of the bore 50. In practice, it has been found that a ratio of 5 to 1 for the height of the cavity to the diameter of the bore, respectively has been useful although it will be appreciated that other dimensions may be useful as well. The size of the cavity 30 may be selected to have any cross sectional dimension as is desired by the user to permit air flow through the combustible body 12 although it will be appreciated that a minimum cross sectional dimension of the cavity will be equal to the cross-sectional dimension of the bore 50. The size of the bore 50 may be selected as desired by a user and as dictated by the size of the combustible body 12. In practice it has been found that a bore 50 having a diameter of 1 inch (25 mm) has been adequate for a combustible body having an overall diameter of 12 inches (254 mm) although it will be appreciated other dimensions may be useful as well.

As illustrated in FIG. 3, the interior surface 32 forming the cavity 30 may be tapered from the top surface 16 to the bottom 28 of the cavity by an angle generally indicated at 44. The taper angle assists in permitting the flame to burn cleanly with minimal smoke. In practice it has been found that any taper angle of up to 20 degrees has been useful with an angle of between 5 and 10 degrees being particularly useful.

In operation, an igniter such as a mass of wood chips and wax or the like, may be lit and placed within the bottom of the cavity 30. The cavity 30 may also be coated with wax or any other suitable fire accelerant to enhance the ability of the combustible body to be lit. The flame from the igniter will thereafter ignite the interior point 38 and exterior points of the slots so as to set the combustible body on fire. Once the cavity 30 of the combustible body 12 has been lit, the fire will burn up the cavity 30 as supplied by air from the bore 50 and will remain substantially within the cavity 30. As the fire increases the size of the cavity the bore 50 will also be burned so as to increase the size of the bore 50 and therefore increase the amount of air supplied to the fire. A cooking article, such as a pot, or the like may be placed on the top surface 16 above the cavity 30 so as to utilize the heat of the fire to cook with. Smoke and heat from the fire may be allowed to escape past the pot by the grooves 22.

While specific embodiments of the invention have been described and illustrated, such embodiments should be considered illustrative of the invention only and not as limiting the invention as construed in accordance with the accompanying claims.

What is claimed is:

1. An apparatus for burning comprising a combustible body having an exterior surface and an axis extending between opposed top and bottom surfaces, said body having an interior surface defining a cavity extending from said top surface, wherein said cavity is tapered to have a cross section proximate to said top surface greater than a cross section proximate to a bottom end thereof and a first bore extending radially from said cavity to an exterior surface wherein said interior surface includes a plurality of slots extending longitudinally therein.

2. The apparatus of claim 1 wherein said interior surface comprises plurality of substantially planar walls.

3. The apparatus of claim 2 wherein said cavity is defined by four substantially planar walls.

4. The apparatus of claim 3 wherein adjacent planar walls are perpendicular to each other.

5. The apparatus of claim 1 wherein said cavity comprises a second bore extending longitudinally within said combustible body.

6. The apparatus of claim 1 wherein said slots are grouped in pairs around said cavity.

7. The apparatus of claim 6 wherein said grouped pairs of slots are perpendicular to each other.

8. The apparatus of claim 2 wherein said slots extend parallel to adjacent planar walls.

9. The apparatus of claim 1 wherein said combustible body is substantially cylindrical about said axis.

10. The apparatus of claim 1 wherein said combustible body is formed of organic material.

11. The apparatus of claim 10 wherein said organic material comprises wood.

12. The apparatus of claim 11 wherein said wood comprises a section of a tree.

13. The apparatus of claim 11 wherein said wood comprises compressed wood particles.

14. The apparatus of claim 13 wherein said top surface includes a plurality of grooves extending from said cavity to said exterior surface.

15. The apparatus of claim 14 further comprising a film of wax applied to said cavity.

16. The apparatus of claim 2 wherein said planar walls have a taper angle from vertical.

17. The apparatus of claim 16 wherein said taper angle is between 5 and 10 degrees.

* * * * *